Dec. 14, 1965 L. KRAMER ETAL 3,222,957
WIRE-STRIPPER MECHANISM
Filed June 8, 1964 3 Sheets-Sheet 1

FIG. I

INVENTORS
LEO KRAMER
ALFRED L. MEDESHA
JOHN P. LAW
BY
David W. Tillott
ATTORNEY

INVENTORS
LEO KRAMER
ALFRED L. MEDESHA
JOHN P. LAW
BY

David W. Tillott
ATTORNEY

Dec. 14, 1965   L. KRAMER ETAL   3,222,957
WIRE-STRIPPER MECHANISM
Filed June 8, 1964   3 Sheets-Sheet 3

INVENTORS
LEO KRAMER
ALFRED L. MEDESHA
JOHN P. LAW
BY
David W. Tibbott
ATTORNEY

3,222,957
WIRE-STRIPPER MECHANISM
Leo Kramer, Chester, N.J., and Alfred L. Medesha, Sayre, and John P. Law, Athens, Pa., assignors to Ingersoll-Rand Company, New York, N.Y., a corporation of New Jersey
Filed June 8, 1964, Ser. No. 373,154
7 Claims. (Cl. 81—9.51)

This invention relates to a mechanism for stripping insulation from a wire and more particularly to a machine or power-operated wire-stripping mechanism.

The principal object of this invention is to provide a simple and relatively economical mechanism for clamping and stripping insulation from a wire utilizing a simple linear movement.

Other important objects include the following: to provide a power-operated, straight-line motion wire-stripper mechanism which is reliable and relatively trouble free; to provide a power-operated, straight-line motion wire-stripper mechanism which pulls the insulation from the wire while holding the wire stationary; to provide a power-operated, straight-line motion wire-stripper mechanism which automatically clamps the wire at the beginning of its stroke and releases it at the end of its stroke; and to provide a power-operated straight-line motion wire-stripper mechanism which does not mutilate the conductor inside the insulation or otherwise damage the conductor such as removing its plating.

These objects are provided generally by mounting a slide on a base, mounting movable wire clamp jaws on the base, mounting movable insulation cutters on the slide, and providing means for closing the wire clamp jaws in response to the starting movement of the insulation stripping stroke of the slide and means for closing the cutters in response to the starting movement of the same stroke of the slide.

The invention is described in connection with the accompanying drawings wherein.

Figure 1:
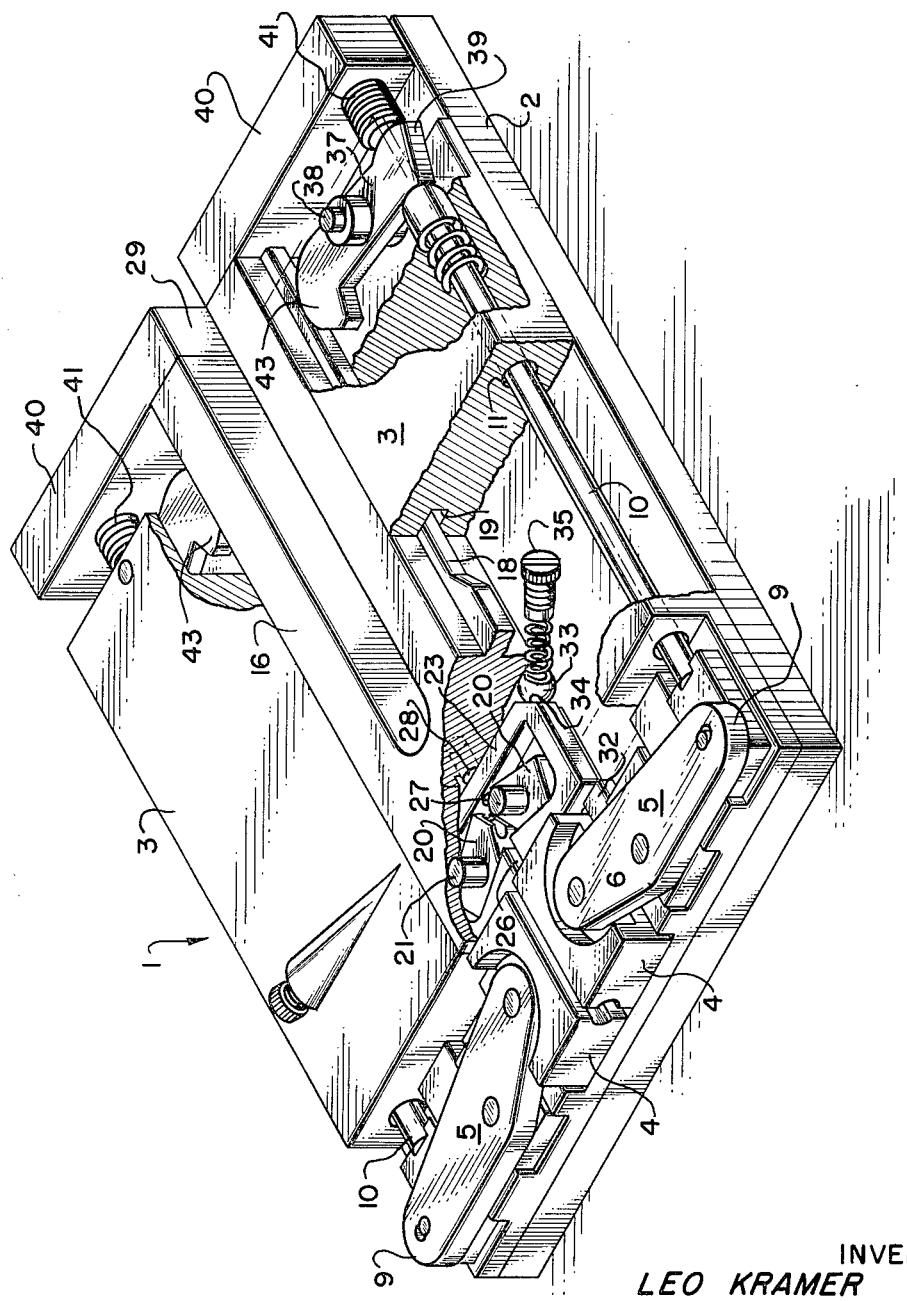
FIG. 1 is a perspective view with portions broken away of a wire-stripping mechanism embodying the concepts of this invention.

The wire-stripper mechanism 1 shown in the drawings is normally used with other mechanisms for handling wire, such as wire-cutting devices, wire wrappers for wrapping the ends of wires around electrical terminals, and wire-soldering devices. In other words, this mechanism is intended to be used in a wire-handling machine which carries out a series of successive wire-handling steps including an insulation-stripping step. Only the wire-stripping mechanism is illustrated and described since other devices which are used with it do not form any part of the invention and may be of a variety of types and structures.

The stripper mechanism 1 includes a base 2 adapted to support the various parts of the mechanism 1 in proper location relative to each other. The base 2 includes a pair of raised longitudinally extending side blocks 3 spaced transversely from each other. A wire-clamping structure is mounted on the front end of the base 2 and includes a pair of wire-clamping jaws 4 pivoted on a corresponding pair of first-class levers 5 which are pivoted on the base 2 by intermediate pivots 6. The jaws 4 are adapted to receive a wire between them. Moving the outer ends 9 of the levers 5 rearward moves the jaws 4 toward each other and into wire-clamping position on the wire. The faces of the jaws 4 are provided with cooperating grooves 8 adapted to close tightly on a wire to hold it against slipping.

The outer end 9 of each lever 5 is pivoted to a link rod 10 which extends rearwardly and is slidably mounted in a guide bore 11 provided in the side block 3. An enlarged head 12 is provided on the rear end of each rod 10 and coil springs 14 are mounted on each rod 10 between its guide bore 11 and head 12 to urge the rod rearwardly. Hence, the springs 14 bias the rods 10 in a direction to close the jaws 4 toward wire-clamping position.

Figure 2:
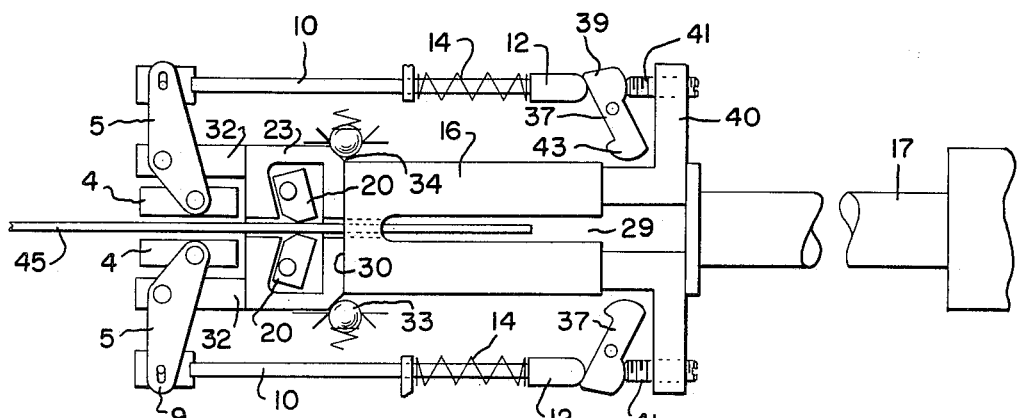
FIG. 2 is a somewhat schematic plan view of the mechanism of FIG. 1 shown at the start of a wire-stripping operation.
Figure 3:
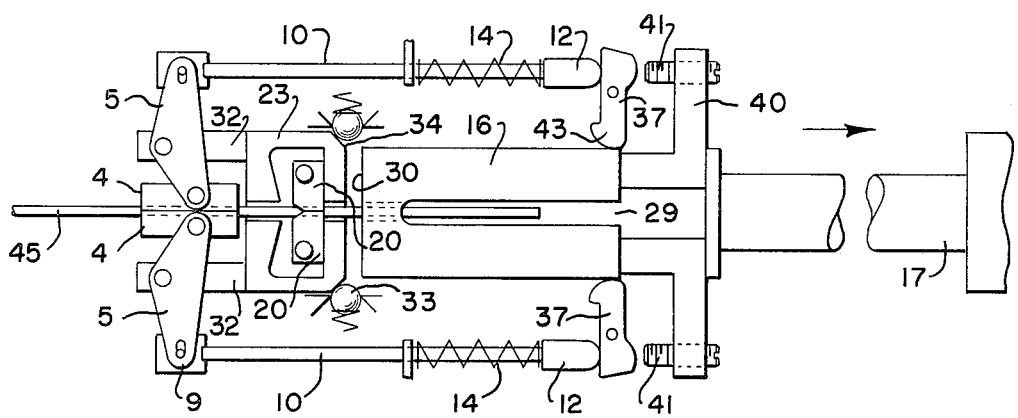
FIG. 3 is similar to FIG. 2 showing the mechanism in an intermediate position with a wire clamped in it and the insulation cutters closed to cut the insulation.
Figure 4:
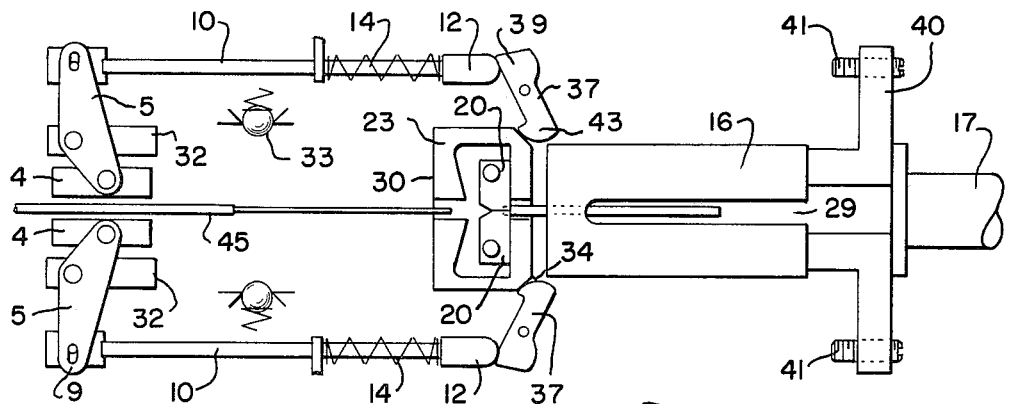
FIG. 4 is similar to FIGS. 2 and 3 showing the mechanism after it has finished stripping the insulation and has released the wire.
Figure 5:
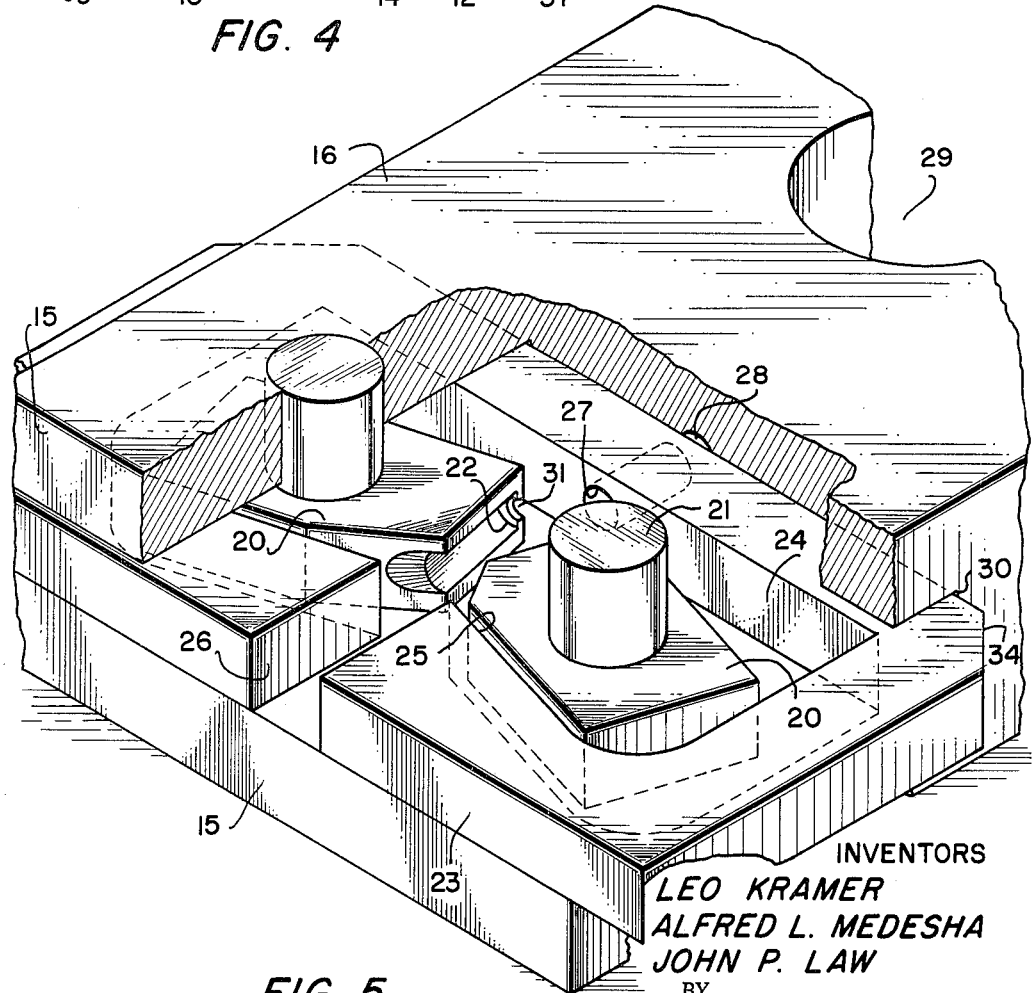
FIG. 5 is a broken and fragmentary perspective view showing the insulation cutters of the mechanism.

A slide 16 is slidably mounted on base 2 between the side blocks 3 for straight-line sliding motion rearwardly on the base, away from the jaws 4 and from the position shown in FIG. 1. A power piston 17 in FIGS. 2 to 4 is illustrated for pulling the slide 16 rearwardly. The piston 17 may be a fluid-operated cylinder, for example. The slide 16 has ribs 18 on its side edges sliding in grooves 19 provided in the side blocks 3 for guiding the slide 16.

A pair of insulation cutters 20 are pivoted on the forward portion of the slide 16 and adapted to receive the wire between them. The front end of the slide 16 is horizontally bifurcated to receive the cuters 20. The cutters 20 are pivoted on pivots 21 attached to the upper and lower bifurcations 15 of the slide 16. The inner ends of the cutters 20 carry respective blades 22 containing semi-arcuate notches 31 adapted to closely conform to the wire core of the wire when the cutters 20 close on the insulated wire. Hence, the blades 22 cut through the insulation and the notches 31 receive the wire core to prevent the blades 22 from touching the wire core. The notches 31 are sized so that as the blades 22 cut through the insulation on the wire, some of the insulation is extruded between the notches 31 to serve as a bushing. As the insulation is pulled from the wire core, this bushing protects the wire core from touching the cutter blades 22. The cutters 20 pivot forwardly toward each other to close on the wire and rearwardly to an open position.

A lost motion member 23 having a C-shape is slidably mounted in the bifurcated front end of the slide 16 to surround the cutters 20 and arranged for linear sliding movement relative to the slide 16 for a short distance. The lost motion member 23 substantially encloses the cutters 20 and has a rear interior face 24 adapted to engage the cutters 20 and force them to close on the wire when moved forwardly on the slide 16. The front interior face 25 of the lost motion member 23 is shaped to engage and force the cutters 20 to open position when moved rearwardly relative to the slide 16.

The front of the lost motion member 23 contains a central slot 26 for receiving a wire lying between the cutters 20. A hole 27 is provided in the rear of the lost motion member 23 for the wire to extend through. The hole 27 is sized to snugly receive the wire and center it in the cutters 20. In addition, the slide 16 contains another hole 28 to receive the wire after it passes between the cutters 20. The slide 16 contains a deep rearwardly opening notch 29 to receive the end portion of the wire as it is being stripped.

The lost motion of the member 23 on the slide 16 is limited by the inner faces 24 and 25 of the member 23. The cutters 20 and pivots 21 are the only means holding the lost motion member 23 in the slide 16. The forward motion of the member 23 relative to the slide 16 is stopped when the cutters 20 are moved into insulation cutting position as shown in FIG. 3. The relative rearward motion of the member 23 on the slide 16 is stopped by abutting the rear wall 30 of the bifurcation in the slide 16.

As the slide 16 moves forward on the base 2, the lost motion member 23 engages the rear ends of bars 32 mounted on the base 2 and is forced rearwardly relative to the slide 16. As the slide 16 initially moves rearwardly from the position shown in FIG. 1, the lost motion member 23 abuts the spring-pressed balls 33 mounted in the base side blocks 3 and is restrained from moving with the slide 16 until reaching the end of its forward lost motion on the slide 16. Once the member 23 reaches the end of its lost motion, the slide 16 drags the member 23 past the spring-pressed balls 33, forcing the balls 33 to be retracted into their seats in the side blocks 3.

The outer rear sides of the member 23 are inclined to form cam surfaces 34 for camming the balls aside. The spring force on the spring-pressed balls 33 is adjusted by the screws 35 which are threaded in corresponding holes in the side blocks 3.

A cam lever 37 is pivoted on the base 2 adjacent the head 12 on the rear end of each link rod 10. Each cam lever 37 is pivoted on a pivot 38 and has an outer arm 39 adapted to engage the rear end of the rod head 12.

The slide 16 includes a pair of outwardly extending feet 40 fixed to its rear end and carrying set screws 41 adapted to abut the rear edge of the outer arm 39 of the lever 37 when the slide 16 is moved to the end of its forward travel, as shown in FIG. 1. The forward force of the slide 16 is transmitted through the screws 41 and the lever 37 to the rods 10 to turn the wire clamp levers 5 and open the wire clamp jaws 4. The screws 41 can be adjusted to control the amount of movement transmitted to the rods 10 by the slide 16.

The cam levers 37 also include inner cam arms 43 adapted to engage the cam surfaces 34 on the lost motion member 23 when the slide 16 reaches the rear end of its travel, as shown in FIG. 4. At this time, the cam levers 37 force the rods 10 forward to open the wire clamping jaws 4. Thus, the wire clamp jaws 4 are automatically opened at both ends of the movement of the slide 16.

*Operation*

At the start of a wire-stripping operation, the mechanism 1 is positioned as shown in FIG. 2. Both the wire clamp jaws 4 and the insulation cutters 20 are open. The slide 16 is moved toward the end of its forward travel with the lost motion member 23 abutting the stop bars 32 and moved relatively rearward on the slide 16 to open the cutters 20. The feet 40 on the slide 16 are engaging the cam levers 37 to press the link rods 10 forward for opening the wire clamp jaws 4. The piston 17 operative to reciprocate the slide 16 is fully extended.

The end of an insulated wire 45 is passed axially between the open wire clamp jaws 4, through the center slot 26, between the cutters 20, through the holes 27 and 28 and into the open notch 29 in the slide 16. The insulated wire 45 contains an inner metallic core 46 and an insulation sheath 47.

Once the wire 45 is in position, the piston 17 can start retracting to pull the slide 16 rearwardly. During the initial rearward travel of the slide 16, the lost motion member 23 remains stationary as a result of being held by the spring-pressed balls 33 engaging the cam surfaces 34. As the lost motion member 23 remains stationary, the cutters 20 are pulled against the rear interior face 24 of the lost motion member 23 and forced to close on the wire 45, as shown in FIG. 3. As the cutters 20 close on the wire, the cutter blades 22 sever the insulation sheath 47 without touching the wire core 46, the core 46 being accommodated within the notches 31 in the cutter blades 22.

Simultaneously with the closing of the cutters 20, the wire clamp jaws 4 are closed on the wire 45 to firmly hold it against axial movement. This is caused by the feet 40 on the slide 16 moving rearwardly to remove the force exerted by the feet on the link rods 10. When this force is removed, the rod springs 14 urge the rods 10 rearwardly to pivot the levers 5 and close the wire clamp jaws 4. This position of the mechanism is shown in FIG. 3.

As the slide continues its rearward movement from the position shown in FIG. 3 to that shown in FIG. 4, the lost motion member 23 is dragged past the spring-pressed balls 33 which are moved aside by the cam surfaces 34 on the member 23. At the same time, the cutters 20 start dragging the severed end portion of the insulation sheath 47 axially from the remainder of the wire 45.

Ultimately, the slide 16 reaches the rear end of its rearward stroke as shown in FIG. 4. At this time, the severed end portion of the wire insulation sheath 47 has been completely pulled from the wire core 46 and is located in the open notch 29 in the slide 16 where it can drop downwardly free of the slide 16.

In addition, the wire 45 is released as a result of the wire clamp jaws 4 being opened. This occurs as a result of the lost motion member 23 engaging the inner cam arms 43 on the cam levers 37 which forces their outer arms 39 forward to push the link 10 forward and open the jaws 4. At this time, the wire 45 can be moved to another station for further use, such as being attached to an electrical terminal.

It should be noted that the wire clamp jaws 4 are opened at both ends of the stroke of the slide 16. As a result, the wire 45 is released at the end of the rearward stroke of the slide 16 so that the slide 16 does not have to return to the forward end of its travel until after the stripped wire 45 is removed from the mechanism 1.

Although a preferred embodiment of the invention has been illustrated and described in detail, it will be understood that the invention is not limited simply to this embodiment but contemplates other embodiments and variations which utilize the concepts and teachings of this invention.

Having described our invention, we claim:

1. A straight-line motion mechanism for stripping insulation from a wire, comprising:
   (a) a base;
   (b) a single slide slidably mounted on said base for movement between first and second positions;
   (c) a pair of wire-clamping jaws movably mounted on said base and mechanically actuated in response to slide position for movement between clamped and unclamped positions;
   (d) a pair of cooperating insulation cutters mounted on said slide and located to receive a wire extending between said wire-clamping jaws;
   (e) means for moving said slide from said first position away from said wire-clamping jaws to said second position;
   (f) biasing means to close said wire-clamping jaws in response to the starting movement of said slide from said first position; and
   (g) positively actuated means carried by said slide and mechanically coupled to said insulation cutters to close said cutters in response to the continuing movement of said slide from said first position.

2. The mechanism of claim 1 wherein:
   (a) said means for closing said wire-clamping jaws includes means holding said jaws open when said slide is in its first position.

3. The mechanism of claim 1 including:
   (a) means for opening said wire-clamping jaws as said slide reaches said second position.

4. The mechanism of claim 1 wherein:
   (a) said positively actuated means for closing said insulation cutters includes detent means mounted on said base and arranged to move said cutters relative to said slide as a result of the motion of the slide until the cutters are closed.

5. The mechanism of claim 4 including:
   (a) including a lost motion member movably mounted on said slide and arranged to engage said cutters and to close them in response to relative movement of said lost motion member on said slide.

6. The mechanism of claim 5 wherein:
(a) said lost motion member includes means to engage said detent means for moving said lost motion member relative to said slide during the starting movement of the slide from said first position.

7. The mechanism of claim 6 including:
(a) abutment means mounted on said base to engage said lost motion member as said slide returns from said second position to said first position to force said lost motion member to move relative to said slide and to open said cutters.

References Cited by the Examiner

UNITED STATES PATENTS

| | | | |
|---|---|---|---|
| 1,666,277 | 4/1928 | White | 81—9.51 |
| 2,338,508 | 1/1944 | Hackbarth | 81—9.51 |
| 2,765,685 | 10/1956 | Stratman et al. | 81—9.51 |
| 2,871,740 | 2/1959 | Andren | 81—9.51 |
| 2,886,995 | 5/1959 | Bach et al. | 81—9.51 |
| 3,002,408 | 10/1961 | Schwalm et al. | 81—9.51 |
| 3,154,980 | 11/1964 | Hayden et al. | 81—9.51 |

WILLIAM FELDMAN, *Primary Examiner.*

MILTON S. MEHR, *Examiner.*